Patented July 25, 1939

2,167,326

UNITED STATES PATENT OFFICE 2,167,326

AGENTS OF CAPILLARY ACTIVITY

Adolf Steindorff, Gerhard Balle, and Paul Heimke, Frankfort-on-the-Main, and Karl Horst, Hofheim-in-Taunus, Germany, assignors to I. G. Farbenindustrie Aktiengesellschaft, Frankfort-on-the-Main, Germany No Drawing. Application May 20, 1937, Serial No. 143,850

4 Claims. (Cl. 260—457)

The present invention relates to agents of capillary activity.

This application is a continuation-in-part of United States patent application Serial No. 51678, filed November 26, 1935, in the name of Adolf Steindorff, Gerhard Balle, Paul Heimke and Karl Horst for: "Agents of capillary activity."

We have found that agents of strong capillary activity are obtainable from bodies of the general formula: $R-O-R_1$ wherein R represents an aromatic or hydroaromatic hydrocarbon radical containing as a substituent at least one aliphatic, araliphatic or cycloaliphatic radical having more than three carbon atoms, and $R_1$ represents an aliphatic radical carrying at least one acid salt-forming group, especially from their water-soluble salts.

The said agents are used with advantage in all cases where a strong capillary action and capacity for diminishing surface tension is desired, for instance, in the textile industry as cleaning agents, as wetting and penetrating agents in the treatment and dyeing of textiles, as emulsifying and dispersing agents for substances insoluble in water, such as oils, fats and waxes, as welling agents for finely divided insoluble solid substances, such as, for instance, dyestuff powders. Those of the products, which contain a sulfo-group as the acid salt-forming group have tanning properties and are capable of dissolving otherwise insoluble ingredients of natural tanning matters. They may, therefore, be used with advantage in the leather industry.

The products may be used either alone or in the form of more or less concentrated aqueous pastes or solutions. They may contain water-soluble inorganic salts, for instance, those which prevent the precipitation of the salts that cause the hardness of water. They may also be used in admixture with bleaching agents or other substances of capillary action.

The products of the present invention may easily be prepared according to known methods. As parent materials there may be used, in the first place, alkylated or cycloalkylated aromatic hydroxy-compounds which may be prepared according to various methods such as, for instance, para-n-butylphenol, isoamylcresols, isohexylxylenols, isododecylnaphthols, ortho- and para-benzylphenol, para-cyclohexyl-phenol as well as the alkylated or cycloalkylated hydroaromatic alcohols obtainable from the said substances by nuclear hydrogenation.

By causing these aromatic or hydroaromatic hydroxyl compounds to react with halogen-fatty acids or halogen-alkyl-sulfonic acids there are obtained the compounds of the above general formula. They may also be prepared by causing the said hydroxyl compounds to react with halogen-hydrins of polyhydric aliphatic alcohols or with alkylene oxides and transforming, by means of a polybasis mineral acid containing oxygen, such as sulfuric acid or phosphoric acid, the introduced hydroxyl group into the acid ester.

The following examples serve to illustrate the invention, but they are not intended to limit it thereto; the parts are by weight:

(1) 306 parts of isododecylphenylglycol ether, obtainable by condensation of a mixture, consisting of dodecylene hydrocarbons and prepared by propylene polymerization, with phenol and subsequent reaction with ethylene chlorhydrine in an alkaline solution, are dissolved in 500 parts of ethylene chloride. 174 parts of chlorosulfonic acid are run into the solution, while stirring, at 10° C. to 15° C. Thereupon the mixture is poured into 300 parts of ice-water and subsequently neutralized by addition of about 250 parts of caustic soda solution of 40 per cent. strength. The solvent is distilled off and the water is removed under reduced pressure. The solid feebly yellow-brown residue contains, besides a small quantity of sodium sulfate, the sodium salt of the acid sulfuric acid ester of the isododecylphenylmonoglycol ether.

A solution containing per liter 0.5 gram of this sodium salt has a very good cleansing effect on soiled cotton laundry.

(2) 214 parts of para-tert. butylcyclohexyl-mono-oxypropyl ether, obtainable by condensation of isobutylene and phenol, catalytical reduction of the tert. butylphenol and reaction of the tert. butylcyclohexanol with propylene-chlorhydrine in an alkaline solution, are slowly sulfonated at 5° C. to 10° C., while stirring, with 150 parts of chlorosulfonic acid. 290 parts of ice are added to the mixture and the whole is neutralized with about 250 parts of a caustic soda solution of 40 per cent. strength. A nearly colorless viscous paste is obtained which contains 35 per cent. of the sodium salt of the acid sulfuric acid ester of para-tert. butylcyclohexyl-monohydroxypropyl ether. Dilute solutions of this paste are very good wetting agents for textiles.

(3) 264 parts of isooctylphenyl-monoglycol ether, obtainable by condensation of di-isobutylene and phenol and reaction with ethylenechlorhydrine in an alkaline solution, are dissolved in 600 parts of ether and sulfonated with 150 parts of chlorosulfonic acid at 15° C. to 20° C., while well stirring. The sulfonation mixture is run, while stirring, into 500 parts of a caustic soda solution of 20 per cent. strength cooled to 5° C. Thereupon, the solvent and the water are distilled off. The dry residue is the sodium salt of the acid sulfuric acid ester of isooctylphenyl-monoglycol ether. A solution of 0.4 per cent. of this product has a very good foaming and cleansing action on woolen and artificial silk tissues.

(4) 290 parts of an alkylcresol mixture, obtainable by condensation of crude cresol and olefinic hydrocarbons having an average content of 13 carbon atoms, as are, for instance, prepared on dehydration of alcohols, containing 6 to 7 carbon atoms, obtainable from carbon monoxide by the isobutanol-synthesis and subsequent polymerization of the dehydration products, are transformed in known manner into the monoglycol ether by treatment with ethylene chlorhydrine in an alkaline solution or with alkylene oxide. 334 parts of this monoglycol ether having the formula:

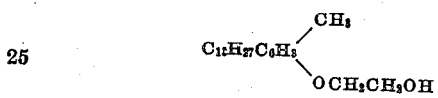

are slowly run into 1000 parts of sulfuric acid of 90 per cent. strength at 15° C. to 20° C. and the whole is stirred at 20° C. until the mass has become soluble to a clear solution. The excess of sulfuric acid is removed by washing the sulfonation mass with saturated sodium chloride solution, neutralizing with caustic soda solution of 33 per cent. strength and evaporation to dryness under reduced pressure. There is formed a body which is pulverizable in the cold, soluble in water to a clear solution and the solutions of which foam strongly. If 10 parts of this sodium salt are mixed with 25 parts of sodium pyrophosphate, 9 parts of sodium perborate, 3 parts of magnesium silicate and 53 parts of sodium sulfate there is obtained a washing agent in the form of a powder which is very suitable for washing cotton laundry.

(5) 306 parts of dodecylphenylmonoglycol ether of the formula $C_{12}H_{25}.C_6H_4.OCH_2.CH_2.OH$ obtainable either by condensation of lauric acid and phenol in the presence of boron trifluoride and subsequent reduction of the para-oxylaurophenone formed to the para-dodecylphenol or by condensation of the monohalogenation products of saturated natural or synthetic hydrocarbons having about 12 carbon atoms and phenol in the presence of a condensing agent such as $AlCl_3$, $ZnCl_2$, $FeCl_3$, $Z_2$ or the like and subsequent transformation of the alkylphenols into the alkylphenylmonoglycol ethers, are dissolved in 600 parts of liquid methylchloride. 174 parts of chlorosulfonic acid are run into this solution, while stirring. The hydrochloric acid which escapes with the methylchloride is washed out therefrom and after condensation the methylchloride is returned to the sulfonation vessel. When the sulfonation is finished, the whole is diluted with 300 parts of ice-water and neutralized with 310 to 320 parts of caustic soda solution of 33 per cent. strength. After distilling off the solvent, there is obtained a paste, ready for use, and of 35 per cent. strength of the sodium salt of the acid sulfuric acid ester of dodecylphenylmonoglycol ether of the formula:

$$C_{12}H_{25}.C_6H_4.O.CH_2.CH_2.OSO_3Na$$

The solution of the product has a very good cleansing effect on woolen and artificial silk tissues.

(6) 248 parts of para-cyclohexylphenyl-hydroxybutyl ether of the formula:

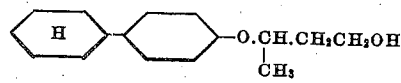

are dissolved in 400 parts of ether. To this solution there is added a solution of 170 parts of chlorosulfonic acid in 200 parts of ether. During this operation a temperature of 10° to 15° C. is to be maintained. Thereupon, the solution is diluted with 250 parts of ice-water and neutralized with 300 parts of caustic soda solution of 33 per cent. strength. After distilling off the solvent and the water, there is obtained a feebly brownish product which dissolves in water to a clear solution. Its solutions possess a very good wetting action.

(7) 280 parts of the dibutylphenylmonoglycerine ether of the formula:

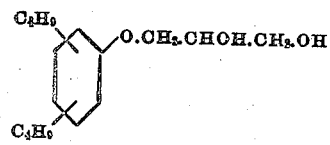

are slowly run into 200 parts of sulfuric acid of 95 per cent. strength, while stirring and maintaining the temperature at 20° C. to 25° C. When the sulfonation mass has become soluble in water to a clear solution, the sulfo-ester is neutralized with about 600 parts of caustic soda solution of 20 per cent. strength. After evaporation under reduced pressure there is obtained a mixture of salts consisting to about 70 per cent. of the sodium salt of the acid sulfuric acid ester of dibutylphenylmonoglycerine ether and to about 30 per cent. of sodium sulfate.

From the sodium sulfate the product may be separated by extraction with ethyl alcohol. The pure sodium salt is a wetting agent of a very good action.

We claim:

1. Agents of capillary activity consisting essentially of the compound dibutylphenyl-monoglycerine ether sulfuric acid ester of the formula:

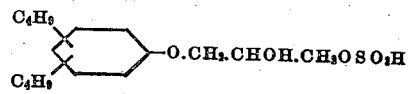

2. A compound of the formula

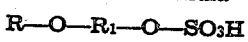

wherein R represents a member of the group consisting of aromatic and hydro-aromatic hydrocarbon radicals substituted at least once by a member of the group consisting of straight chain aliphatic, araliphatic and cycloaliphatic hydrocarbon radicals having more than three carbon atoms and $R_1$ represents a member of the group consisting of alkylene and monohydroxyalkylene radicals.

3. A compound of the formula

wherein R represents a member of the group consisting of aromatic and hydro-aromatic hydrocarbon radicals substituted at least once by a member of the group consisting of straight chain aliphatic, araliphatic and cycloaliphatic hydrocarbon radicals having more than three carbon atoms and $R_1$ represents an aliphatic hydrocarbon radical.

4. A compound of the formula $$R-O-R_1-O-SO_3H$$

wherein R represents a member of the group consisting of aromatic and hydro-aromatic hydrocarbon radicals substituted at least once by a member of the group consisting of straight chain aliphatic, araliphatic and cycloaliphatic hydrocarbon radicals having more than three carbon atoms and $R_1$ represents an alkylene radical with not more than four carbon atoms.

ADOLF STEINDORFF.
GERHARD BALLE.
PAUL HEIMKE.
KARL HORST.